July 7, 1964 W. M. BENSON 3,140,061

REEL HOLDING AND CENTERING HUB

Filed Oct. 2, 1961 3 Sheets-Sheet 1

INVENTOR.
WILLIAM M. BENSON
BY
Christie, Parker & Hale
ATTORNEYS.

July 7, 1964 W. M. BENSON 3,140,061

REEL HOLDING AND CENTERING HUB

Filed Oct. 2, 1961 3 Sheets-Sheet 2

INVENTOR.
WILLIAM M. BENSON
BY
Christie, Parker & Hale
ATTORNEYS.

July 7, 1964 W. M. BENSON 3,140,061

REEL HOLDING AND CENTERING HUB

Filed Oct. 2, 1961 3 Sheets-Sheet 3

INVENTOR.
WILLIAM M. BENSON

BY Christie, Parker & Hale
ATTORNEYS.

United States Patent Office 3,140,061
Patented July 7, 1964

3,140,061
REEL HOLDING AND CENTERING HUB

William M. Benson, Temple City, Calif., assignor to Consolidated Electrodynamics Corporation, Pasadena, Calif., a corporation of California Filed Oct. 2, 1961, Ser. No. 142,386
1 Claim. (Cl. 242—68.1)

This invention relates to reel holders. More specifically, it relates to holding and centering hubs for magnetic tape reels.

As the data processing and data recording industry has grown in recent years, increased effort and research has been devoted to the problem of devising a magnetic tape reel holding mechanism which is simple in construction and convenient in operation. The ideal to be attained in such a device is that it be inexpensive to produce and simple to operate. Also, the reel holding hub must securely hold the reel relative to the reel drive mechanism and it should accurately center the reel relative to its axis of rotation. Moreover, such a device should be adaptable for use with reels handling tapes of different widths since the magnetic recording tape utilized may vary in width from one quarter to one inch or more.

This invention provides a reel hub and centering device which is a mechanically simple device, which is simple to operate, and which securely holds the reel relative to the reel drive table while accurately centering the reel relative to the axis about which it rotates. The hub of this invention is continuously engaged with the shaft of a reel drive table so that there is no possibility that the hub may be misplaced during a change of tape reels. The hub is adapted such that in one position relative to its auxliary apparatus it provides clearance for installation of the reel relative to the reel drive mechanism. In another position relative to its auxiliary apparatus the reel hub securely holds the reel relative to the reel drive table and accurately and quickly positions the reel relative to its axis of rotation.

The hub is operable either by clockwise or counterclockwise rotation such that a left-handed person may conveniently use the device as well as a right-handed person. This results in the device being extremely simple to operate. Moreover, the device of this invention is compatible with reels accommodating all standard tape widths.

Generally speaking, the invention provides a tape reel hub and holder having utility when used with a tape reel table rotatable about an axis. A body member is mounted to the table coaxially therewith. At least one longitudinal external groove and at least one external recess are formed in the body so as to intersect each other. Hub positioning means are provided in the recess at a location spaced from the intersection. A hub member is journalled around the body member. Projection means engaged within the intersecting groove and recess are provided on the hub member. The projection means are engageable with the hub positioning means. The invention further provides means for biasing the hub member relative to the tape reel table. Also, the invention includes means on the exterior of the hub member engagable with a reel positioned on the reel table to secure the reel to the table and to center the reel relative to the axis.

The following detailed description and explanation of the invention will be facilitated by reference to the accompanying drawings, wherein.

Figure 1:
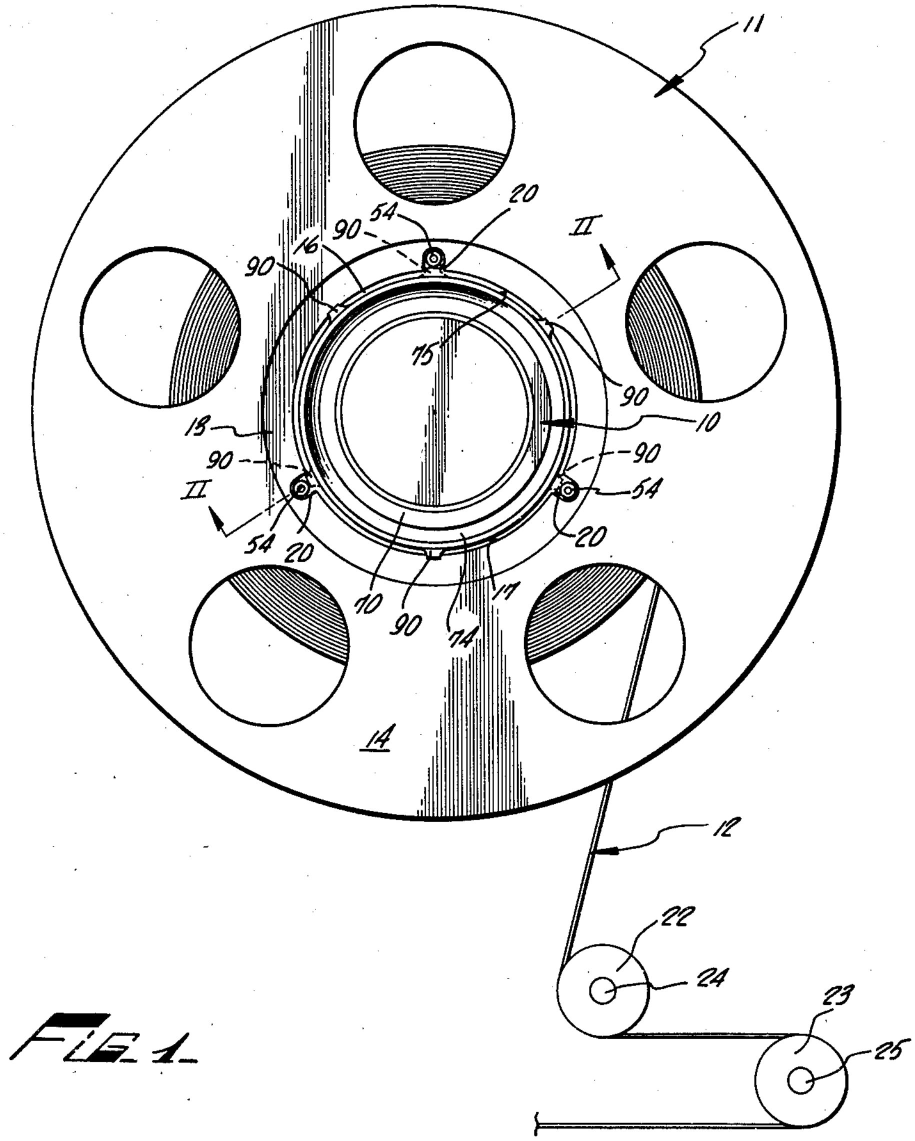
FIGURE 1 is an elevational view of a tape reel secured by the hub.

Referring to FIGURE 1, the reel hub and centering mechanism 10 is illustrated in conjunction with a tape reel 11 upon which is coiled a length of magnetic recording tape 12. The reel 11 is fabricated of a circularly cylindrical hollow core or hub 13 and a pair of radially extending parallelly spaced-apart side-plates 14 and 15. The side-plates 14 and 15 are spaced apart a distance corresponding to the width of the tape 12 which the reel 11 holds. The core or hub 13 of the reel 11 has an inner circumferential surface 16 and an upper peripheral edge 17 (see FIGURE 2) at the limit of the inner surface 16 remote from a tape transport deck or plate 18. The inner circumferential surface 16 has a plurality of longitudinal grooves 20 formed around its extent. The grooves 20 are spaced equidistantly from one another and extend from side to side of the reel 11. The grooves 20 have a predetermined width and depth and are generally semicircular at their radial extremities relative to the center of the reel 11.

For the purpose of illustrating the environment of this invention, but forming no part thereof, a pair of tape guides 22 and 23 rotatable about axes 24 and 25, respectively, are shown in FIGURE 1 spaced apart from reel 11. The tape filament 12 is threaded around the guides 22 and 23.

Figure 2:
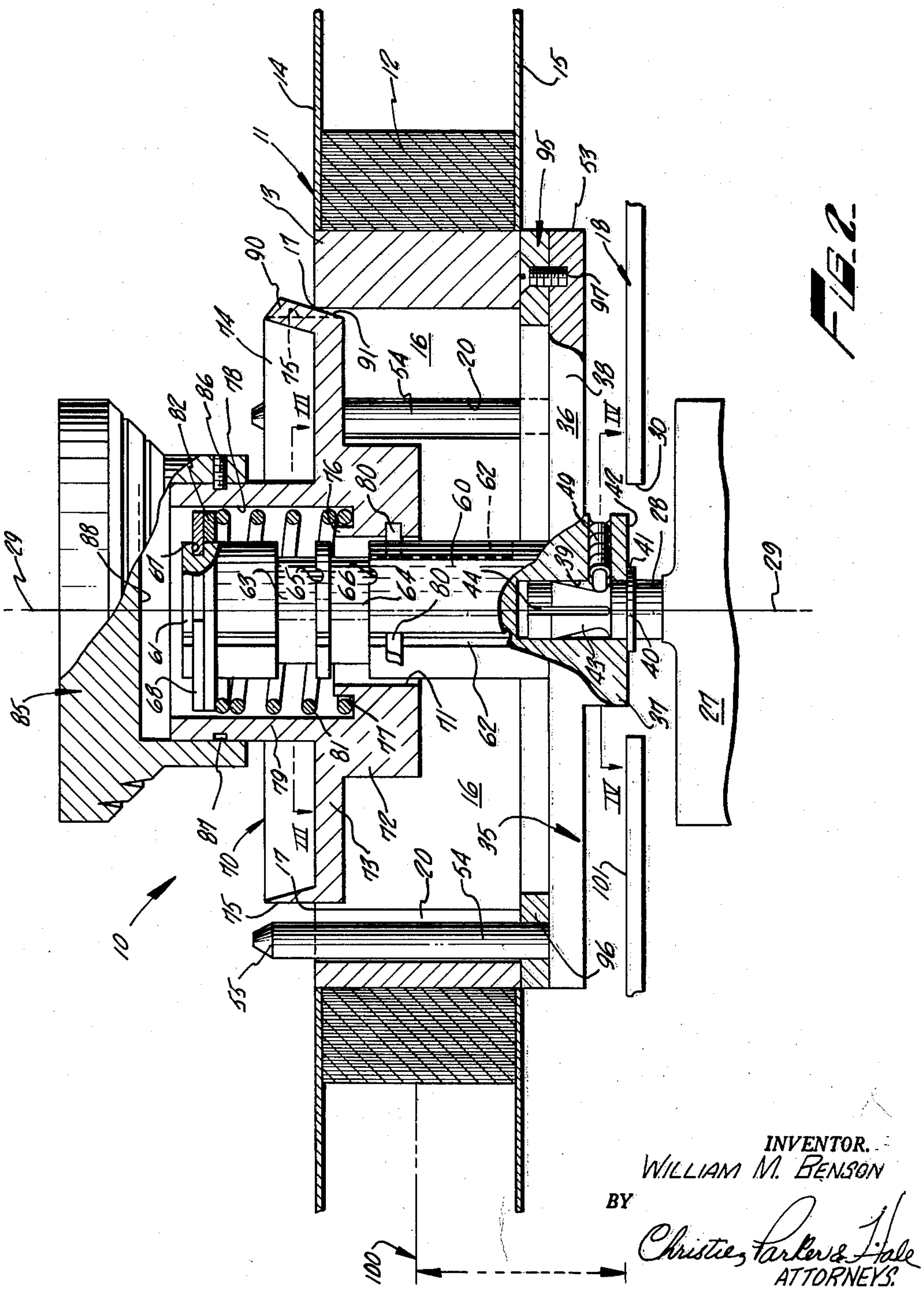
FIGURE 2 is an enlarged cross-sectional view of the tape reel and hub as taken along line II—II of FIGURE 1.

Referring to FIGURE 2, a motor 27 is mounted (by means not shown) behind the tape transport deck 18. The motor 27 has a shaft 28 rotatable about an axis 29. The shaft 28 projects through an aperture 30 in the tape transport deck 18 to the forward side of the deck 18.

The tape-centering hub 10 of this invention is utilized in conjunction with a reel drive table 35 which is affixed to shaft 28. The reel table 35 comprises a circular planar portion 36 which extends perpendicular to the axis 29 and is concentric thereto. A hub or boss 37 is formed in the rear side 38 of the planar portion 36 (i.e., the lower side as viewed in FIGURE 2) and has an axial bore 39 extending into the boss or hub 37. The shaft 28 has a circumferential groove 40 formed therein adjacent the motor 27 in which is engaged a spring clip or retainer washer 41. The rear surface 42 of the hub 37 is engaged against the retaining washer 41.

Figure 4:
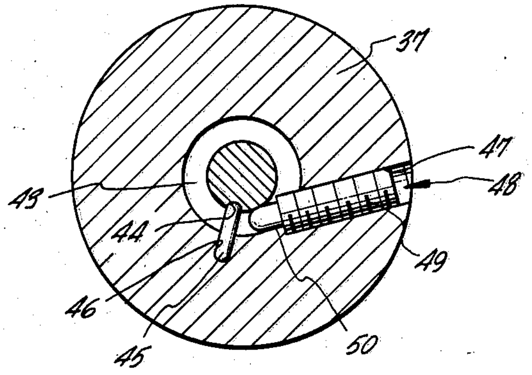
FIGURE 4 is a cross-sectional view as taken along line IV—IV of FIGURE 2 illustrating the mechanism for securing the reel table to the shaft of the reel drive motor.

Between the groove 40 and the end of the shaft 28, the shaft 28 has a circumferential tapering portion 43 extending inwardly toward the axis 29 and then curving circularly outwardly to the maximum diameter of the shaft 28. A keyway 44 is formed longitudinally in this portion 43 of the shaft 28 and is adapted to receive a key 45 which is also engaged in a keyway 46 in reel drive table hub 37 (see FIGURE 4). The key 45 assures that no lost motion occurs between table 35 and shaft 28 as the shaft 28 reverses its direction of rotation.

A hole 47 is drilled and tapped through the hub 37 substantially tangentially to the minimum diameter of tapered portion 43. A plug 48 having a threaded portion 49 and a rounded circular extension 50 at its inner end is engaged within the bore 47. The extension or projection 50 on plug 48 has a diameter conforming to the diameter of the circular portion at the end of the tapered length 43 on shaft 28. When the plug 48 is securely engaged within the bore 47, the extension 50 of plug 48 is securely engaged against the minimum diameter portion of the tapered length 43 and induces the reel table 35 to securely abut the retaining washer 41. This apparatus results in the exact positioning of the reel table 35 relative to the tape transport deck 18, the reasons for which will be explained later.

The planar radial portion 36 of the reel table 35 extends to an external circumferential surface 53. A plurality of pins or posts 54 are mounted to the table 35 adjacent the peripheral surface 53. The pins or posts 54 are mounted perpendicular to the planar portion 36 and lie parallel to the axis 29. The pins 54 are spaced equidistantly from one another and are equally spaced from the axis 29. The same number of pins 54 are provided as there are longitudinal grooves 20 in the core 13 of reel 11. The pins 54 serve to transfer rotary motion of the reel table 35 to the reel 11. The pins 54 have chamfered upper ends 55.

As illustrated most clearly in FIGURE 2, the pins 54 are engaged in the radial extremities of the grooves 20 such that there is a finite distance between the inner extremities of the pins 54 and the inner circumferential surface 16 of the reel core 13.

Figure 3:
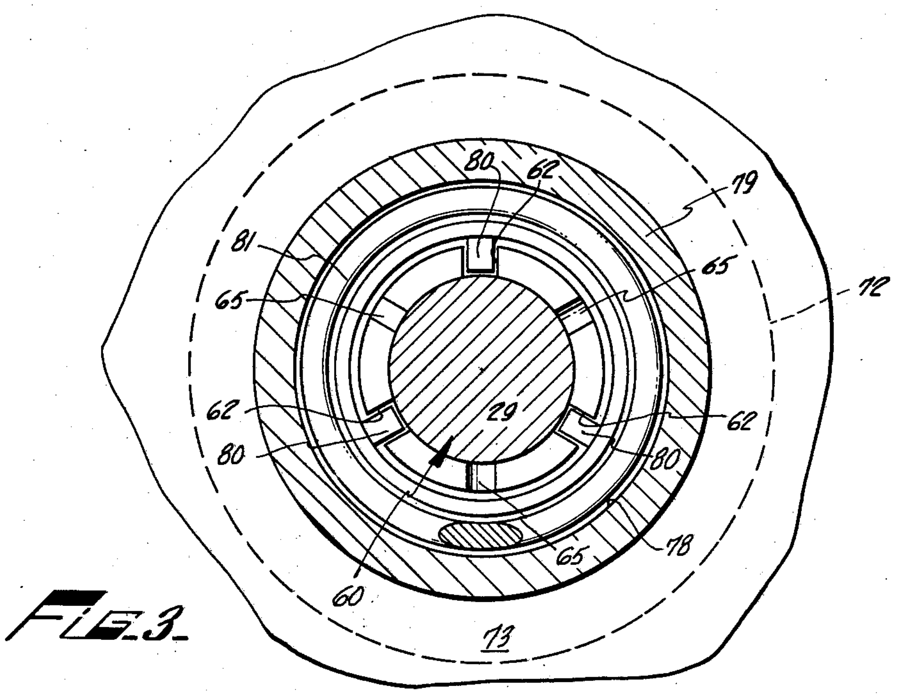
FIGURE 3 is a cross-sectional plan view of the body member, the hub member, and the biasing means as taken along line III—III of FIGURE 2.

A body member or hub engaging post 60 extends perpendicularly from the table 35 and is coaxially oriented with respect to the axis 29 of the shaft 28. The post-like body member 60 serves as a guide means for the hub member 70 which is described in detail below. The body 60 is circularly cylindrical and extends to an upper end 61. A plurality of longitudinal grooves 62 are formed in the body 60 and extend from adjacent the table 35 to the upper end 61 of the body. Any desired number of the grooves 62 may be provided, but in a preferred embodiment of the invention there are three such grooves 62 as there are three grooves 20 in the core 13 and three reel drive posts 54. A plurality of circumferential grooves or recesses, 63 and 64, two being illustrated in FIGURE 2, are formed in the exterior of the body 60 intermediate the table 35 and the upper or free end 61 of the body 60. These grooves or recesses 63 and 64 are of the same depth as the longitudinal grooves 62 and intersect the longitudinal grooves 62 at right angles. A plurality of lock or hub positioning means 65 and 66 are provided in a wall of the recesses 63 and 64, respectively, intermediate of the intersections. In FIGURE 2 these lock positioning means 65 and 66 are illustrated as circular cross-sectioned recesses or depressions in the side walls of the recesses 63 and 64 adjacent the reel table 35. Ideally, there are the same number of depressions 65 and 66 as there are longitudinal grooves 62, and these notches or depressions 65 and 66 are formed midway between the intersections of the groove 62 with the recesses 63 and 64 (see FIGURE 3).

At the upper end 61 of the body member 60, a circumferential groove 67 is provided. A spring clip or retainer ring 68 is engaged within this slot 67; its function will be explained later.

A hub or clamp member 70 is engaged with the body member 60. The hub 70 has a central bore 71 having a diameter slightly greater than the diameter of body member 60. The clamp 70 is engaged so as to journal the body member 60 by passing the body member into the bore 71. A boss or reel table stop portion 72 is formed adjacent the lower end of the bore 71. A radial web or diaphragm portion 73 of the clamp member 70 extends from adjacent the upper end of boss 72 radially of the axis 29 and terminates in a circumferential upstanding flange or rim 74. The rim 74 has a cylindrical outer surface 75 concentric to axis 29. The distance from axis 29 to the peripheral surface 75 is slightly less than the internal diameter of the circumferential surface 16 of reel 11 (see FIGURE 2).

The bore 71 extends to an upper limit or lip 76 having its upper extremity adjacent the upper surface of the radial diaphragm 73. A recess 77 is formed adjacent the lip 76 and extends coaxially of axis 29 into the boss 72. An enlarged diameter bore or spring recess 78 concentric with axis 29 extends from the recess 77 to the upper limit of the clamp member 70 to provide a tubular sleeve or extension 79 of the clamp member 70. The diameter of the recess 78 is greater than the diameter of the spring retainer 68 engaged in slot or groove 67 of body member 60.

Radial projections 80 are formed in the boss 72 and extend inwardly of the bore 71. Preferably, there is one such projection or guide pin 80 for each of the longitudinal grooves 62 in body member 60. The dimensions of the guide projections 80 are consistent with the widths of the longitudinal grooves and the radial grooves or slots 63 and 64 and, in a preferred embodiment of the invention, have a radius corresponding to the radii of the lock-positioning or seating depressions 65 and 66.

A spring 81 for resiliently biasing the clamp member 70 relative to the body member 60 and to the table 35 is engaged within the recess 78 between the lower recess 77 and the washer 68. A plain washer 82 is engaged against the retainer 68 and serves as a bearing for spring 81 when clamp member 70 is rotated. The post 60 serves as a means for guiding the clamp member 70 relative to the reel table 35.

A knob 85, serving as a means for reciprocation and rotation of the clamp member 70 relative to the reel table 35, is engaged with the clamp member 70 as by a setscrew 86 engaged in a circumferential external groove 87 in the clamp member sleeve portion 79. In order to accommodate such connection of the knob 85 to the clamp member 70, the knob has a coaxial bore or cavity 88 extending from its lower end.

The relation between the spring 81 and the retaining rings 68 permanently secures the clamp member 70 to the body member 60. Therefore, provision must be made for insertion of a tape reel 11 onto the reel table 35 over clamp members 70 and for engaging clamp member 70 with the reel 11 after the reel is disposed on the table 35. The means for accomplishing this result must retain the feature of allowing the hub 70 to hold and center the reel 11 relative to the reel drive table 35. To this end, a plurality of projections or inclined plane extensions 90 are provided on the external periphery 75 of the reel hub 70. These extensions 90 have an outer inclined surface 91 extending upwardly and outwardly from the intersection of the peripheral surface 75 with the underside of the diaphragm portion 73. The angle which the surface 91 makes with the normally cylindrical surface 75 of the clamp member 70 is, in part, determined by the clearance between the reel table posts 54 and peripheral surface 75 and by the extent of surface 75 coaxially of axis 29. The extreme radial limits of the clamp and centering extensions 90 must not be greater than the radial distance from axis 29 to the chambered ends 55 of the drive posts 54. Moreover, the maximum radial dimension of the extensions 90 from axis 29 must be greater than the distance from axis 29 to the inner circumferential surface 16 of the reel core 13. The peripheral extent of the projecting extensions of clamp member 70 must be no greater than the width of the grooves 20 in reel core 13.

The projections 90 are positioned around the hub 70 such that, when the guide projections 80 of boss 72 are engaged within the longitudinal grooves 62 of body member 60, the clamping and centering extensions 90 are positioned between the drive table posts 54. Conversely, when the guide projections 80 are engaged within the lock-positioning depressions 65 or 66, the clamping extensions 90 are positioned adjacent the drive posts 54 as illustrated by the dashed lines in FIGURE 1. In a preferred embodiment of the invention there are three longitudinal grooves 62 in body member 60. There are three grooves 20 in the tape reel core 13, and also there are three drive posts 54 and three clamping and centering extensions 90 on the hub 70. Each one of these groups of elements 62, 20, 54, and 90 of the apparatus are spaced at one hundred twenty degrees (120°) of arc from one another. This, however, is not a limitation to the scope of this invention since any number of longitudinal grooves 62 and depressions 65 and 66 may be utilized with this invention. The number of guide projections 80 should, preferably, correspond to the number of grooves 62 and to the number of depressions 65. The number of the projections 90 utilized for holding and clamping the reel 11 relative to the reel drive table preferably corresponds to the number of drive posts 54 mounted to the reel table 35. There is no requirement, however, that the number of the drive posts 54 correspond to the number of longitudinal grooves 62. Ideally, the relationship between depressions 65 and 66 and the intersections of the recesses 63 and 64 with the longitudinal grooves 62 is such that, when the guide projections 80 are engaged within the longitudinal groove 62, then the clamping projections 90 are midway between the drive posts 54.

In operation of the reel centering and clamping device 10, installation of the reel 11 on reel table 35 requires that the clamp member 70 be actuated against the bias of spring 81 and that the guide projections 80 be engaged within the locking depressions 65 or 66. In this situation the clamping projections or extensions 90 are positioned adjacent the drive posts 54. The reel 11 is then engaged with the reel table 35 by aligning the grooves 20 on the reel core 13 with the drive posts 54 and by sliding the reel 11 into contact with the reel table 35. Then the knob 85 is indexed such that the guide posts 80 are engaged within the longitudinal grooves 62 of the body post 60. The bias of spring 81 urges the clamping member 70 toward the reel table 35 such that the inclined surfaces 91 of the clamping projections 90 engage the edge 17 of the reel core 13. The inclined surfaces 91 on projections 90 are carefully milled or ground so as to be concentric to axis 29. In this respect, the inclined surfaces 91 accurately center the reel 11 relative to the axis 29. The force of spring 81 securely holds the reel 11 against the reel table 35 (see FIGURE 2).

It was mentioned above that the reel centering and holding device 10 has utility with reels having an axial dimension corresponding to the various widths of tape 12 utilized in data recording apparatus. Normally, tapes having widths of one-quarter (¼) inch, one-half (½) inch, three-quarters (¾) inch, and one (1) inch are so used. The one-half (½) and one (1) inch widths may be utilized directly with the apparatus of this invention thus far described. When a one-half inch reel is utilized, the guide projections 80 are engaged with the depressions 66 in the circumferential recess 64 of the body post 60. When a one-inch tape width is utilized, the guide projections 80 are engaged within the depressions 65 of the circumferential recess 63. The axial distance between the circumferential recesses 63 and 64 of the post 60 is, then, determined by the widths of the tape reels to be used on reel table 35.

If, however, the one-quarter or three-quarter inch widths are utilized, a spacer 95 is secured to the drive table 35 (see FIGURE 2). The spacer 95 illustrated in a planar ring having a maximum radius corresponding to the radius of the planar portion 36 of the drive table 35. The inner radius of the annular ring 95 is less than the radial distance to the drive posts 54. The spacer 95 has a plurality of holes 96 drilled therethrough parallel to the axis 29 of shaft 28. The number of the holes 96 corresponds to the number of the reel table drive posts 54. A plurality of counter-sunk screws 97 are utilized to secure the spacer ring 95 to the reel table 35.

The spacer ring 95 is required when the tape transport apparatus, with which the reel holding and centering device 10 is utilized, is dependent upon the center line 100 of the tape 12 being a predetermined and fixed distance from the front surface 101 of the tape transport deck 18. In many tape transport apparatuses, however, the system is dependent upon the tape edge being a predetermined distance from the tape transport deck 18. In this case, the spacer 95 is not required and the reel centering and clamping device 10 may be utilized without recourse to the spacer 95.

The apparatus described has the feature that the reel clamping member 70 and the knob 85 are continuously engaged with the reel table 35. This is true so long as the spring clip 68 is engaged within the groove 61 on the body post 60. Because of this feature, the centering device 10 cannot become lost or misplaced when tape reels are being changed. Furthermore, because of the manner of operation of the guide projections 80 in the longitudinal grooves 62 of the body posts 60, the centering and clamping mechanism 10 is adaptable for reels accommodating any of the standard tape widths utilized in the data recording industry. Additionally, since the orientation of the clamp projections 90 and the guide grooves 62 are such that the clamp projections are positioned midway between the drive posts 54, the device 10 is as simple to operate in a left-hand manner as in a right-hand manner.

While the invention has been described above in conjunction with specific apparatus, this has been by way of example only and is not to be considered as a limitation to the scope of this invention.

I claim:

A hub and holder for a tape reel having a hollow cylindrical base and a plurality of uniformly spaced longitudinal grooves in the inner periphery of the base, the hub comprising a reel table rotatable about an axis, a plurality of pins mounted perpendicularly to the table and engageable in the reel base grooves, a cylindrical body member mounted coaxially to the table having a plurality of longitudinal external grooves and having a plurality of external circumferential recesses having intersections with the body member grooves and having clamp ring positioning means in the recesses intermediate the intersections, a clamp ring having an axial bore journalled around the body member for movement relative to the body member, projection means in the clamp ring bore engaged within the body member grooves and being engageable with the clamp ring positioning means upon movement of the projection means into engagement with at least one of the recesses, spring means between the body member and the clamp ring for biasing the ring toward the table, handle means secured to the ring for reciprocating and rotating the ring relative to the body member, and a plurality of inclined surface projection means on the exterior of the ring corresponding in number to the plurality of table pins alignable adjacent the pins to permit installation of a reel on the table and engageable against the reel to secure the reel to the table and to center the reel relative to the axis when the ring is rotated.

References Cited in the file of this patent

UNITED STATES PATENTS

| | | |
|---|---|---|
| 2,146,835 | Merwin | Feb. 14, 1939 |
| 2,149,631 | Rodda | Mar. 7, 1939 |
| 2,654,550 | Winkler | Oct. 6, 1953 |
| 2,905,408 | Frate et al. | Sept. 22, 1959 |
| 2,960,278 | Tronslin | Nov. 15, 1960 |
| 2,992,788 | Hardison | July 18, 1961 |
| 3,035,788 | Horberg | May 22, 1962 |
| 3,053,466 | Rehklau | Sept. 11, 1962 |

FOREIGN PATENTS

| | | |
|---|---|---|
| 390,537 | Germany | Feb. 20, 1924 |
| 851,307 | Great Britain | Oct. 12, 1960 |
| 198,164 | Switzerland | Sept. 1, 1938 |